(12) United States Patent
Yuki (10) Patent No.: US 11,059,754 B2
(45) Date of Patent: Jul. 13, 2021

(54) HONEYCOMB STRUCTURE (71) Applicant: NGK Insulators, Ltd., Nagoya (JP)

(72) Inventor: Kazuya Yuki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 213 days.

(21) Appl. No.: 16/285,807

(22) Filed: Feb. 26, 2019

(65) Prior Publication Data

US 2019/0284101 A1 Sep. 19, 2019

(30) Foreign Application Priority Data

Mar. 19, 2018 (JP) .............................. JP2018-050893

(51) Int. Cl.
*C04B 38/00* (2006.01)
*B01D 46/24* (2006.01)
*B01D 53/94* (2006.01)
*B01J 35/04* (2006.01)
*B01J 37/00* (2006.01)

(52) U.S. Cl.
CPC ...... *C04B 38/0019* (2013.01); *B01D 46/2466* (2013.01); *B01D 53/94* (2013.01); *B01J 35/04* (2013.01); *B01J 37/0018* (2013.01); *C04B 38/0009* (2013.01); *C04B 38/0012* (2013.01); *B01D 2046/2481* (2013.01); *B01D 2255/9155* (2013.01)

(58) Field of Classification Search
None
See application file for complete search history.

(56) References Cited

U.S. PATENT DOCUMENTS

| | | | | |
|---|---|---|---|---|
| 2003/0053940 A1* | 3/2003 | Harada | .................. | C04B 37/001 422/180 |
| 2005/0214503 A1 | 9/2005 | Sakamoto | | |
| 2009/0246452 A1* | 10/2009 | Ogura | ..................... | B28B 19/00 428/116 |
| 2014/0093436 A1* | 4/2014 | Nishio | .................. | F01N 3/0222 422/171 |

FOREIGN PATENT DOCUMENTS

JP 2003-340224 A1 12/2003

* cited by examiner

*Primary Examiner* — David Sample
*Assistant Examiner* — Elizabeth Collister
(74) *Attorney, Agent, or Firm* — Burr & Brown, PLLC (57) ABSTRACT

A honeycomb structure includes plugged honeycomb segments, bonding layers and a circumferential wall. The bonding layers includes bottomed-hollow unbonded portions, which extend toward an internal side in an axial direction from an end face of the honeycomb structure, in portions of circumferential bonding layers bonding the honeycomb segments on an outermost circumference. The unbonded portions exist on respective extended lines extending from an intersection of the bonding layers which is closest to a centroid of the end face. An opening length of the unbonded portion is 1 to 10 mm, a ratio of an opening depth of the unbonded portion to a length of the honeycomb segment is 10 to 45%, and a ratio of a distance from the circumferential wall to a point at which an open end of the unbonded portion ends to a length of the circumferential bonding layer is 5 to 100%.

9 Claims, 7 Drawing Sheets

HONEYCOMB STRUCTURE

The present application is an application based on JP 2018-050893 filed on Mar. 19, 2018 with Japan Patent Office, the entire contents of which are incorporated herein by reference.

BACKGROUND OF THE INVENTION

Field of the Invention

The present invention relates to a honeycomb structure. More particularly, the present invention relates to a segmented-structure honeycomb structure in which a plurality of honeycomb segments are bonded with bonding layers.

Description of the Related Art

Exhaust gas emitted from various internal combustion engines such as a diesel engine includes a great deal of particulate matter such as dust, soot, and carbon particulates. For this reason, a purification device that purifies exhaust gas emitted from an automobile that uses a diesel engine as a power source employs a diesel particulate filter (DPF), for example. Hereinafter, particulate matter may be called "PM". Moreover, a diesel particulate filter may be called "DPF".

The DPF is commonly a structure that is sectioned by porous partition walls into a plurality of cells acting as fluid through channels and makes the porous partition walls configured to form the cells function as a filter by alternately plugging the open ends of the plurality of cells.

When the DPF continues to remove PM in the exhaust gas, the PM becomes deposited within the DPF and thus the purification efficiency is decreased and the pressure loss of the DPF is increased. Therefore, the purification device using the DPF needs to perform a "reproduction process" of combusting the deposited PM by using high-temperature exhaust gas generated from the diesel engine.

In the case of the reproduction process described above, because a high thermal stress is generated in the DPF due to the combustion heat of the PM, measures to prevent the breakage of the DPF are necessary. Particularly, a passenger car and the like have a tendency to increase the frequency of reproduction process and thus measures to prevent the breakage of the DPF are particularly important.

Conventionally, as a technology for preventing the breakage of such the DPF, there has been proposed a technology for bonding a plurality of segments each having honeycomb structure via bonding materials without manufacturing DPF having one honeycomb structure (see Patent Document 1). Hereinafter, "a segment having honeycomb structure" may be called "a honeycomb segment". Moreover, "a honeycomb structure in which a plurality of honeycomb segments are bonded with bonding layers" may be called "a segmented-structure honeycomb structure". In addition, a honeycomb structure to be contrasted with such the segmented-structure honeycomb structure includes a honeycomb structure in which all partition walls constituting the honeycomb structure form one continuous structural object. The "honeycomb structure in which all partition walls form one continuous structural object" may be called a "monolithic honeycomb structure".

[Patent Document 1] JP-A-2003-340224

The segmented-structure honeycomb structure has a problem that the total thermal stress of the honeycomb structure can be absorbed but cracks etc. are easy to occur in the bonding layers of the circumferential portion of the honeycomb structure. For example, the honeycomb structure for DPF may load an oxidation catalyst in order to promote the oxidation and combustion of PM during a reproduction process. When loading the oxidation catalyst, the honeycomb structure is coated with slurry including the oxidation catalyst and then is subject to heat treatment at high temperature to be baked, but cracks etc. may occur in the bonding layers of the circumferential portion during this heat treatment. Moreover, even in sudden temperature rising and sudden temperature falling of the exhaust gas generated during driving a vehicle, cracks etc. may occur in the bonding layers.

Recently, in large trucks etc. there is a tendency to switch from the DPF made of cordierite to the DPF made of SiC due to the request of downsizing etc. of DPF, and the adoption of the DPF made of large-sized SiC increases. The large-sized DPF has a problem that a temperature difference between the inside and outside of the DPF more easily occurs, and thus a crack easily occurs when loading a catalyst.

Moreover, in employing SiC, unified DPF obtained by unifying SCR and DPF loads a great deal of catalytic amount, and materials having low heat conduction with high porosity tend to be used as the materials of the DPF. Herein, "SCR" is an abbreviation of "Selective Catalytic Reduction: selective reduction NOx catalyst". Because the high-porosity materials have characteristically low heat conduction, using the high-porosity materials as the material of DPF leads to a problem that a temperature difference between the inside and outside of DPF easily occurs, and thus a crack easily occurs when loading a catalyst.

The present invention has been achieved in view of the problems of the above conventional technology. According to the present invention, there is provided a honeycomb structure that can effectively suppress the extension of a crack occurring in bonding layers for bonding a plurality of honeycomb segments.

SUMMARY OF THE INVENTION

According to the present invention, there is provided a honeycomb structure to be described below.

According to a first aspect of the present invention, a honeycomb structure is provided, including: a plurality of prismatic columnar honeycomb segments; bonding layers that bond side faces of the plurality of honeycomb segments with respect to each other; and a circumferential wall that is disposed to surround an outer circumference of a honeycomb segment bonded body obtained by bonding the honeycomb segments with the bonding layers in a state where the honeycomb segments are arrayed in a grid pattern, wherein each of the honeycomb segments includes porous partition walls disposed to surround a plurality of cells extending from an inflow end face to an outflow end face in an axial direction and a segmented outer wall disposed to surround the partition walls, an end of each of the cells in each of the honeycomb segments is plugged by a plugging portion at any one of the inflow end face and the outflow end face, the bonding layers include bottomed-hollow unbonded portions, which extend toward an internal side in the axial direction from the inflow end face or the outflow end face, in portions of circumferential bonding layers for bonding the honeycomb segments arranged on an outermost circumference of the honeycomb segment bonded body, the unbonded portions exist, in the inflow end face or the outflow end face, on respective extended lines extending, in directions in which the bonding layers extend, from an intersection of the bonding layers existing at a position closest to a centroid of the corresponding inflow end face or the corresponding outflow end face of the honeycomb segment bonded body, an opening length of each of the unbonded portions in the directions in which the bonding layers extend is 1 to 10 mm in the inflow end face or the outflow end face, a ratio of an opening depth of each of the unbonded portions in the axial direction to a length of each of the honeycomb segments in the axial direction is 10 to 45%, and a ratio of a distance from the circumferential wall to a point at which an open end of each of the unbonded portions ends with respect to a length of each of the circumferential bonding layers in the directions in which the bonding layers extend is 5 to 100% in the inflow end face or the outflow end face.

According to a second aspect of the present invention, the honeycomb structure according to the first aspect is provided, wherein the unbonded portions further exist, in the inflow end face or the outflow end face, on extended lines extending, in the directions in which the bonding layers extend, from intersections of the bonding layers existing at a second closest position to the centroid of the corresponding inflow end face or the corresponding outflow end face of the honeycomb segment bonded body.

According to a third aspect of the present invention, the honeycomb structure according to the first or second aspects is provided, wherein the unbonded portions exist in both of the inflow end face and the outflow end face of the honeycomb segment bonded body.

According to a fourth aspect of the present invention, the honeycomb structure according to any one of the first to third aspects provided, wherein a width of each of the bonding layers in the inflow end face or the outflow end face of the honeycomb segment bonded body is 0.3 to 3.0 mm.

Effects of the Invention

The honeycomb structure according to the present invention can effectively suppress the extension of a crack occurring in the bonding layers of the honeycomb segment bonded body. In other words, because the bonding layer have the bottomed-hollow unbonded portions in portions of the circumferential bonding layers for bonding the honeycomb segments arranged on the outermost circumference of the honeycomb segment bonded body, the extension of a crack can be effectively suppressed by the unbonded portions when the crack occurs in the bonding layers.

DETAILED DESCRIPTION OF THE INVENTION

Hereinafter, exemplary embodiments of the present invention will be explained, but the present invention is not limited to the following embodiments. Therefore, it should be understood that those in which modifications, improvements, etc. have been appropriately added to the following embodiments based on ordinary knowledge of those skilled in the art without departing from the spirit of the present invention are within the scope of the present invention.

(1) Honeycomb Structure

One embodiment of a honeycomb structure according to the present invention is a honeycomb structure 100 that includes a plurality of honeycomb segments 4, bonding layers 14, and a circumferential wall 13 as shown in FIGS. 1 to 4. The honeycomb structure 100 according to the present embodiment is the so-called segmented-structure honeycomb structure 100. The honeycomb structure 100 according to the present embodiment can be preferably used as a trapping filter for removing particulate matter contained in exhaust gas.

Figure 1:
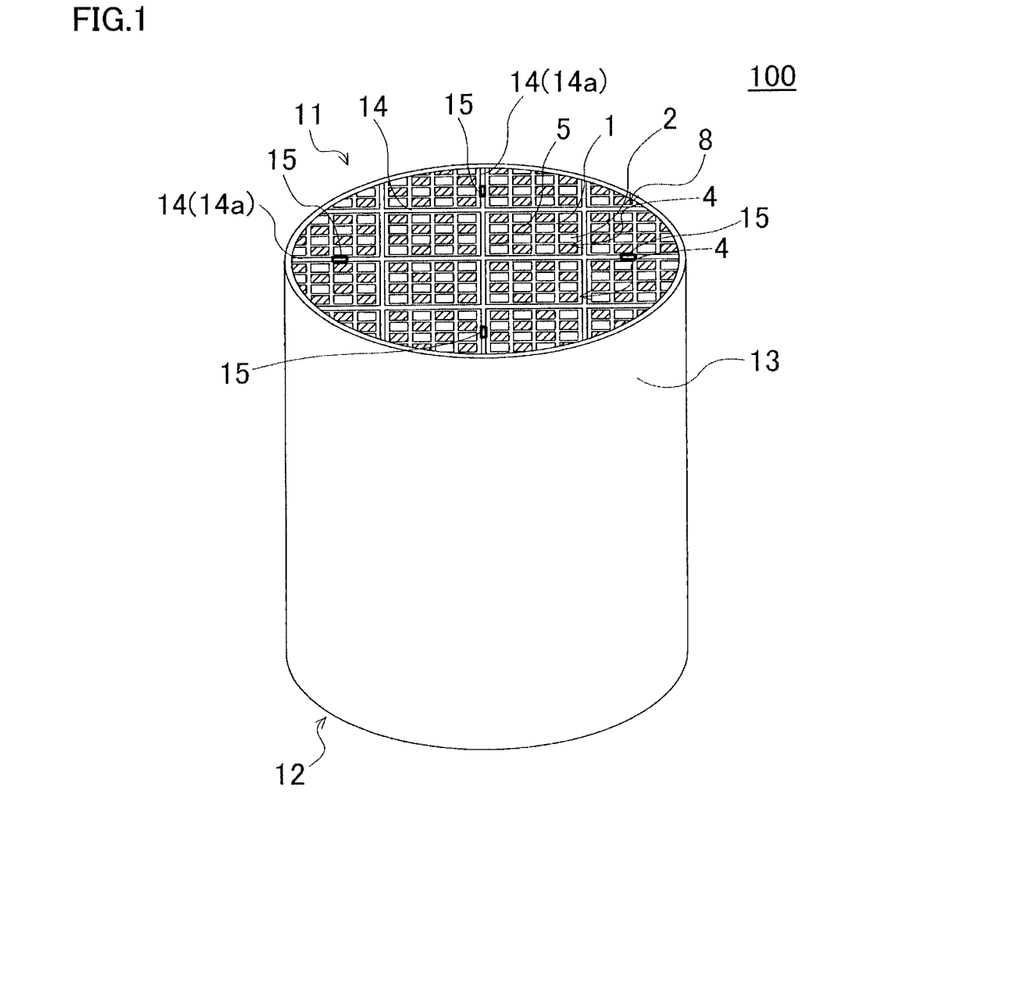
FIG. 1 is a perspective view schematically showing one embodiment of a honeycomb structure according to the present invention.
Figure 2:
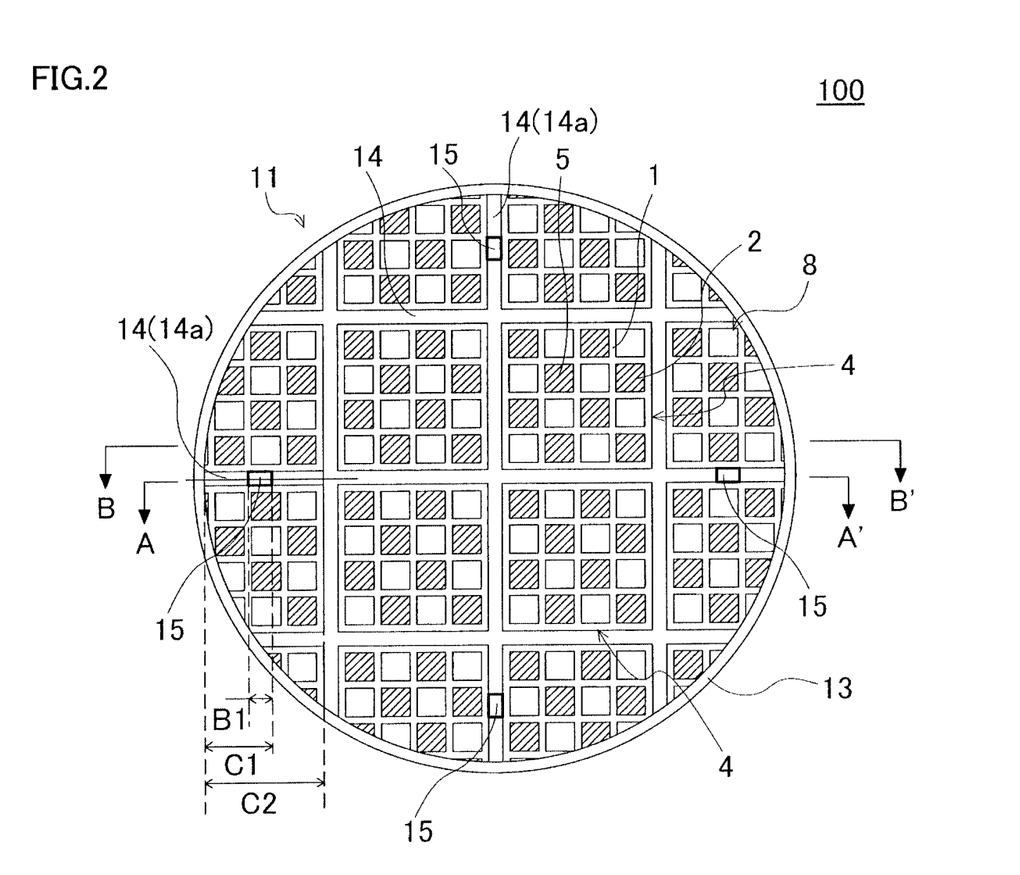
FIG. 2 is a plan view showing an inflow end face of the honeycomb structure shown in FIG. 1.
Figure 3:
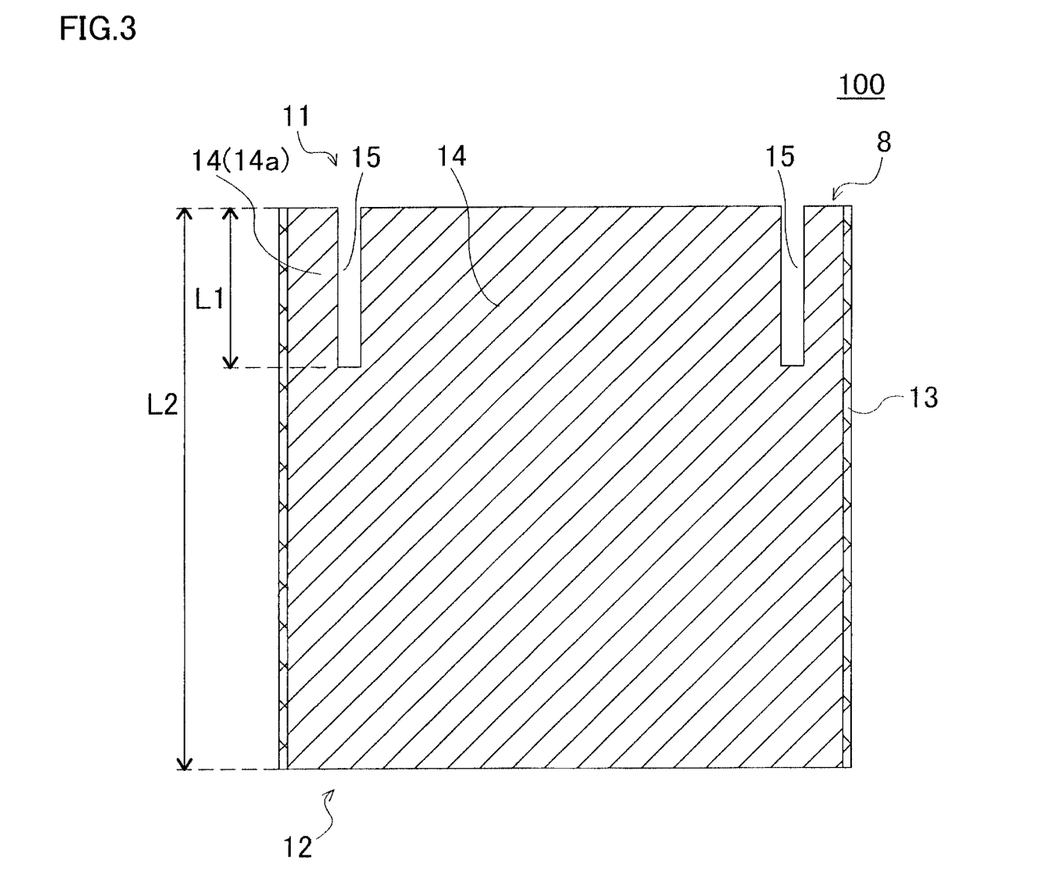
FIG. 3 is a cross-sectional view schematically showing a cross section viewed from the A-A' line in FIG. 2.
Figure 4:
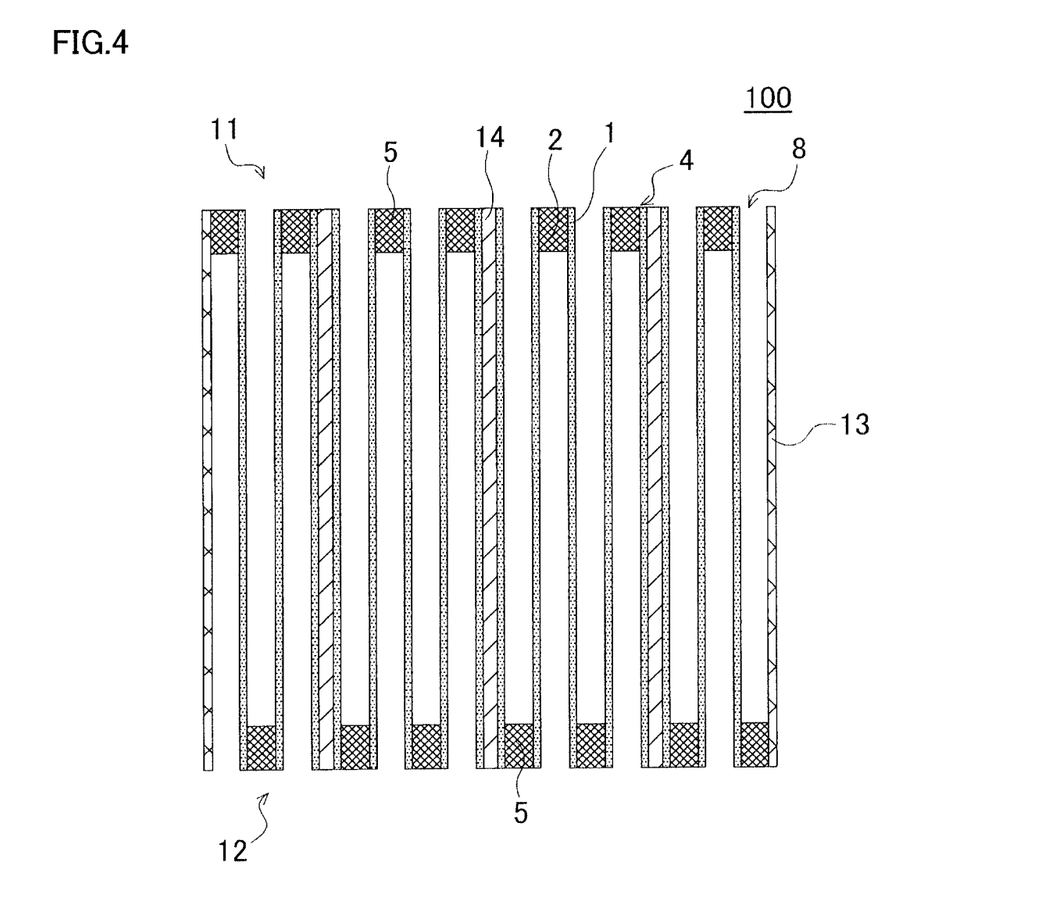
FIG. 4 is a cross-sectional view schematically showing a cross section viewed from the B-B' line in FIG. 2.

Herein, FIG. 1 is a perspective view schematically showing one embodiment of the honeycomb structure according to the present invention. FIG. 2 is a plan view showing an inflow end face of the honeycomb structure shown in FIG. 1. FIG. 3 is a cross-sectional view schematically showing a cross section viewed from the A-A' line in FIG. 2. FIG. 4 is a cross-sectional view schematically showing a cross section viewed from the B-B' line in FIG. 2.

Each of the honeycomb segments 4 includes porous partition walls 1 disposed to surround a plurality of cells 2 that extends from an inflow end face 11 up to an outflow end face 12. Each of the honeycomb segments 4 is configured to further include a segmented outer wall on the circumferential portion of the partition walls 1 so that its overall shape becomes prismatic columnar for example. In addition, in the present invention, each of the cells 2 means a space that is surrounded by the partition walls 1.

The honeycomb structure 100 includes the plurality of honeycomb segments 4 and the side faces of the plurality of honeycomb segments 4 are bonded via the bonding layers 14. Among the plurality of honeycomb segments 4, the honeycomb segments 4 arranged in the central portion of the honeycomb structure 100 have a "prismatic columnar" shape in which a direction from the inflow end face 11 toward the outflow end face 12 is defined as an axial direction. On the other hand, among the plurality of honeycomb segments 4, the honeycomb segments 4 arranged in a circumferential portion that is in contact with the circumferential wall 13 have a pillar shape in which a portion of the honeycomb segment 4 formed in a prismatic columnar shape is ground along the shape of the circumferential wall 13. Hereinafter, in the present specification, an "axial direction" means a direction parallel to the direction of the honeycomb segments 4 from the inflow end face 11 toward the outflow end face 12 unless otherwise specified.

The bonding layers 14 are formed by a bonding material which bonds the side faces of the plurality of honeycomb segments 4 each other. Hereinafter, a bonded body in which the plurality of honeycomb segments 4 is bonded via the bonding layer 14 may be called a "honeycomb segment bonded body 8". In the honeycomb structure 100 according to the present embodiment, the honeycomb segment bonded body 8 is formed by bonding the plurality of honeycomb segments 4 with the bonding layers 14 to be arranged in a grid pattern. The circumferential wall 13 is disposed to surround the outer circumference of the honeycomb segment bonded body 8.

In each of the cells 2 in each of the honeycomb segments 4, the end of one of the inflow end face 11 and the outflow end face 12 is plugged by a plugging portion 5. In other words, in each of the honeycomb segments 4, the plugging portions 5 are disposed in open ends of the predetermined cells 2 in the inflow end face 11 and in open ends of the residual cells 2 other than the predetermined cells 2 in the outflow end face 12.

Hereinafter, the cells 2 (i.e., the predetermined cells 2 described above) for which the plugging portions 5 are disposed in their open ends in the inflow end face 11 of each of the honeycomb segments 4 may be called "outflow cells". The cells 2 (i.e., the residual cells 2 described above) for which the plugging portions 5 are disposed in their open ends in the outflow end face 12 of each of the honeycomb segments 4 may be called "inflow cells".

The honeycomb structure 100 particularly has a main feature with respect to the configuration of the bonding layers 14 for bonding the honeycomb segments 4. In other words, the bonding layers 14 include bottomed-hollow unbonded portions 15, which extend from the inflow end face 11 or the outflow end face 12 toward an axial-direction internal side, in portions of circumferential bonding layers 14a for bonding the honeycomb segments 4 arranged on the outermost circumference of the honeycomb segment bonded body 8. Herein, as shown in FIG. 2, the "circumferential bonding layers 14a" of the bonding layers 14 indicate bonding layers (the circumferential bonding layers 14a) for bonding the side faces of the honeycomb segments 4 arranged on the outermost circumference of the honeycomb segment bonded body 8 when the plurality of honeycomb segments 4 are bonded with the bonding layers 14 in a grid pattern. Each of the "unbonded portions 15" means a bottomed-hollow void portion that does not bond the side faces of the two honeycomb segments 4.

The unbonded portions 15 respectively exist, in the inflow end face 11 or the outflow end face 12, on extended lines that are extended in directions in which the bonding layers 14 extend from an intersection of the bonding layers 14 existing at a position closest to the centroid of the inflow end face 11 or the outflow end face 12 of the honeycomb segment bonded body 8. In addition, the "centroid" of the inflow end face 11 or the outflow end face 12 of the honeycomb structure 100 means a centroid in geometric meaning. The "intersection" of the bonding layers 14 means an intersection point at which the bonding layers 14 extending vertically and horizontally, for example in the inflow end face 11, intersects with each other when the plurality of honeycomb segments 4 are bonded with the bonding layers 14 in a grid pattern as shown in FIG. 2.

In the inflow end face 11 or the outflow end face 12 of the honeycomb structure 100 according to the present embodiment, an opening length B1 of each of the unbonded portions 15 in the directions in which the bonding layers 14 extend is 1 to 10 mm. Moreover, a ratio (L1/L2×100%) of an opening depth L1 of each of the unbonded portions 15 in the axial direction with respect to a length L2 of each of the honeycomb segments 4 in the axial direction is 10 to 45%.

Furthermore, in the inflow end face 11 or the outflow end face 12, a ratio (C1/C2×100%) of a distance C1 from the circumferential wall 13 to a point at which the open end of each of the unbonded portions 15 ends with respect to a length C2 of each of the circumferential bonding layers 14a in the directions in which the bonding layers 14 extend is 5 to 100%.

The honeycomb structure 100 according to the present embodiment can effectively suppress the extension of a crack occurring in the bonding layers 14. In other words, because the portions of the circumferential bonding layers 14a of the bonding layers 14 have the unbonded portions 15 having predetermined shapes, when a crack occurs in the bonding layers 14, the extension of the crack is stopped by the unbonded portions 15 and thus the subsequent extension of the crack can be effectively suppressed. Particularly, in the segmented-structure honeycomb structure 100, a crack easily occurs in the bonding layers 14 close to the circumferential wall 13 and a crack occurring near the circumferential wall 13 extends toward inside of each end face of the honeycomb structure 100 along the bonding layers 14. For this reason, the honeycomb structure 100 according to the present embodiment can effectively suppress the extension of a crack by using the unbonded portions 15. In addition, in the honeycomb structure 100 according to the present embodiment, it is preferable that portions, such as the unbonded portions 15, which do not bond the side faces of the two honeycomb segments 4 are not provided in portions other than the circumferential bonding layers 14a of the bonding layers 14.

When the opening length B1 of each of the unbonded portions 15 in the directions in which the bonding layers 14 extend is less than 1 mm, the effect suppressing the extension of a crack is not sufficiently obtained. When the opening length B1 of each of the unbonded portions 15 in the directions in which the bonding layers 14 extend exceeds 10 mm, bond strength is decreased. Hereinafter, "the opening length B1 of each of the unbonded portions 15 in the directions in which the bonding layers 14 extend" may be simply called "the opening length B1 of each of the unbonded portions 15". The opening length B1 of each of the unbonded portions 15 is preferably 2 to 8 mm and is further preferably 2 to 5 mm.

When a ratio of the opening depth L1 of each of the unbonded portions 15 in the axial direction with respect to the length L2 of each of the honeycomb segments 4 in the axial direction is less than 10%, the effect suppressing the extension of a crack is not sufficiently obtained. When a ratio of the opening depth L1 of each of the unbonded portions 15 in the axial direction with respect to the length L2 of each of the honeycomb segments 4 in the axial direction exceeds 45%, bond strength is decreased. Hereinafter, the opening depth L1 of each of the unbonded portions 15 in the axial direction may be simply called "the void depth L1" of each of the unbonded portions 15. Moreover, a ratio of the void depth L1 of each of the unbonded portions 15 to the length L2 of each of the honeycomb segments 4 in the axial direction may be simply called "the ratio of the void depth" of each of the unbonded portions 15. The ratio of the void depth of each of the unbonded portions 15 is preferably 10 to 40% and is further preferably 20 to 40%.

When a ratio of the distance C1 from the circumferential wall 13 to a point at which the open end of each of the unbonded portions 15 ends with respect to the length C2 of each of the circumferential bonding layers 14a in the directions in which the bonding layers 14 extend is less than 5%, the circumferential portion of the honeycomb structure 100 may cause strength degradation (e.g., edge chipping etc.). When a ratio of the distance C1 from the circumferential wall 13 to the point at which the open end of each of the unbonded portions 15 ends with respect to the length C2 of each of the circumferential bonding layers 14a in the directions in which the bonding layers 14 extend exceeds 100%, it is not preferable in terms of the crack suppression effect. Hereinafter, a ratio of the distance C1 from the circumferential wall 13 to the point at which the open end of each of the unbonded portions 15 ends with respect to the length C2 of each of the circumferential bonding layers 14a in the directions in which the bonding layers 14 extend may be called "the position ratio of the open end" of each of the unbonded portions 15. The position ratio of the open end of each of the unbonded portions 15 is preferably 10 to 80% and is further preferably 10 to 50%.

Figure 5:
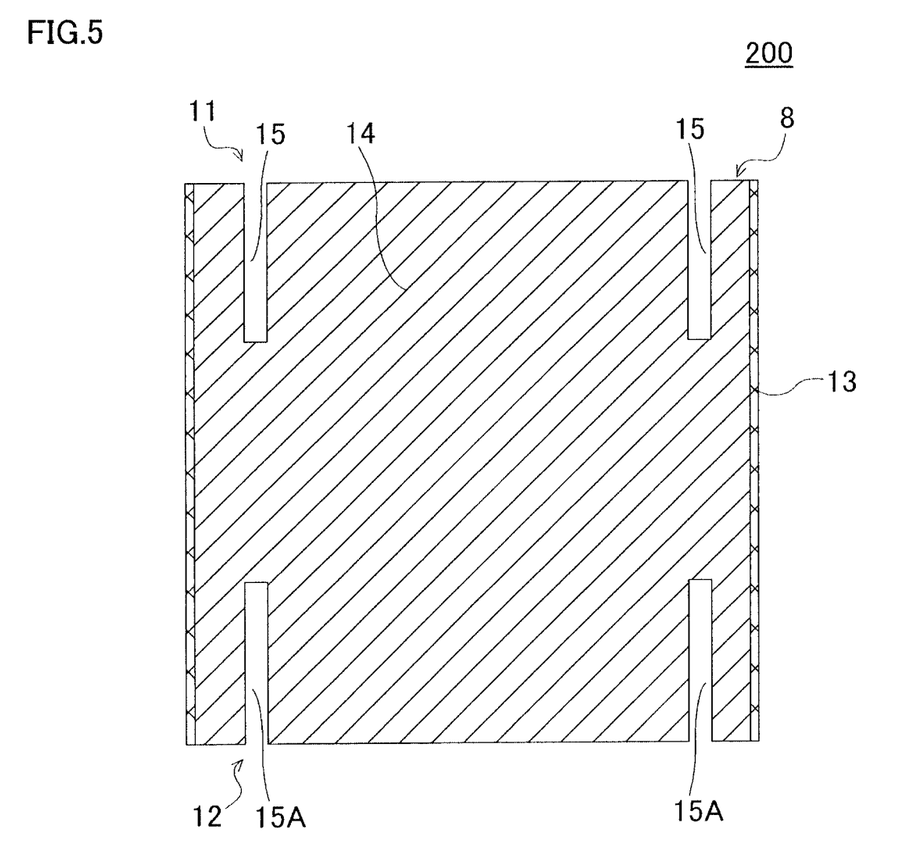
FIG. 5 is a cross-sectional view schematically showing another embodiment of a honeycomb structure according to the present invention.

In the honeycomb structure 100 shown in FIGS. 1 to 4, the unbonded portions 15 are formed to extend toward the axial-direction internal side from the inflow end face 11. In this regard, however, the unbonded portions 15 only need to be formed to extend toward the axial-direction internal side from one of the inflow end face 11 and the outflow end face 12. For example, in a honeycomb structure 200 shown in FIG. 5, the unbonded portions 15 and unbonded portions 15A are formed to extend toward the axial-direction internal side from both of the inflow end face 11 and the outflow end face 12. Herein, FIG. 5 is a cross-sectional view schematically showing another embodiment of a honeycomb structure according to the present invention. In the honeycomb structure 200 shown in FIG. 5, the same components as those of the honeycomb structure 100 shown in FIGS. 1 to 4 have the same reference numbers and their descriptions are omitted. The cross section shown in FIG. 5 shows a cross section corresponding to the cross section (i.e., the cross section shown in FIG. 3) viewed from the A-A' line in FIG. 2. Moreover, although it is not shown, the unbonded portions may be only formed to extend toward the axial-direction internal side from the outflow end face.

When the unbonded portions 15 and 15A are formed in both of the inflow end face 11 and the outflow end face 12 like the honeycomb structure 200 shown in FIG. 5, there is an advantage that it is possible to further reduce the number of occurrences of a crack. Of course, even if the unbonded portions 15 are formed in only one (the inflow end face 11 in FIG. 3) of the end faces like the honeycomb structure 100 shown in FIG. 3, the extension of a crack in the one end face can be effectively suppressed. For this reason, an end face forming the unbonded portions 15 can be appropriately selected in accordance with a usage environment etc. of the honeycomb structure 100. Moreover, such the honeycomb structure 100 has an advantage that a manufacturing process becomes simple and easy and productivity is excellent.

Figure 6:
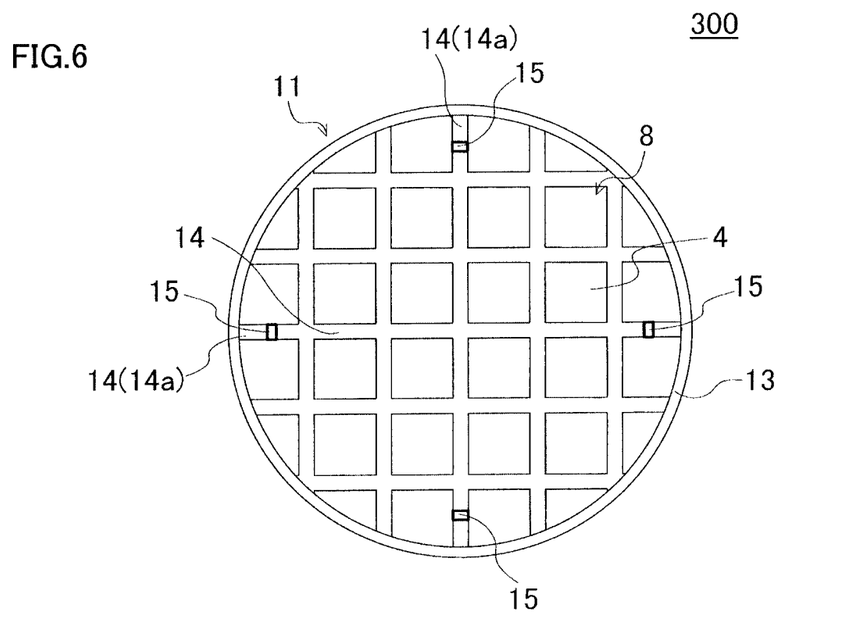
FIG. 6 is a plan view schematically showing further another embodiment of a honeycomb structure according to the present invention.
Figure 7:
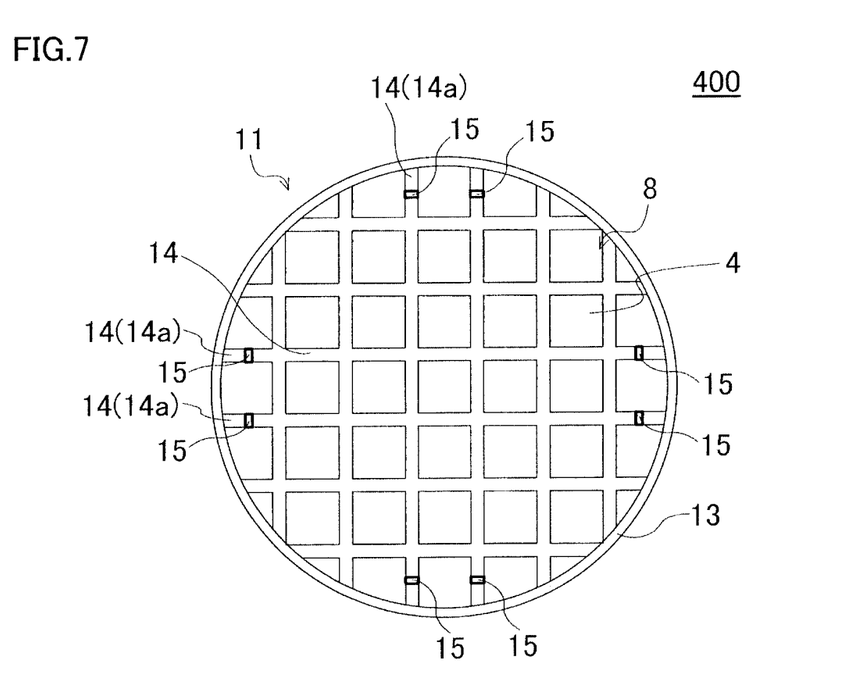
FIG. 7 is a plan view schematically showing further another embodiment of a honeycomb structure according to the present invention.
Figure 8:
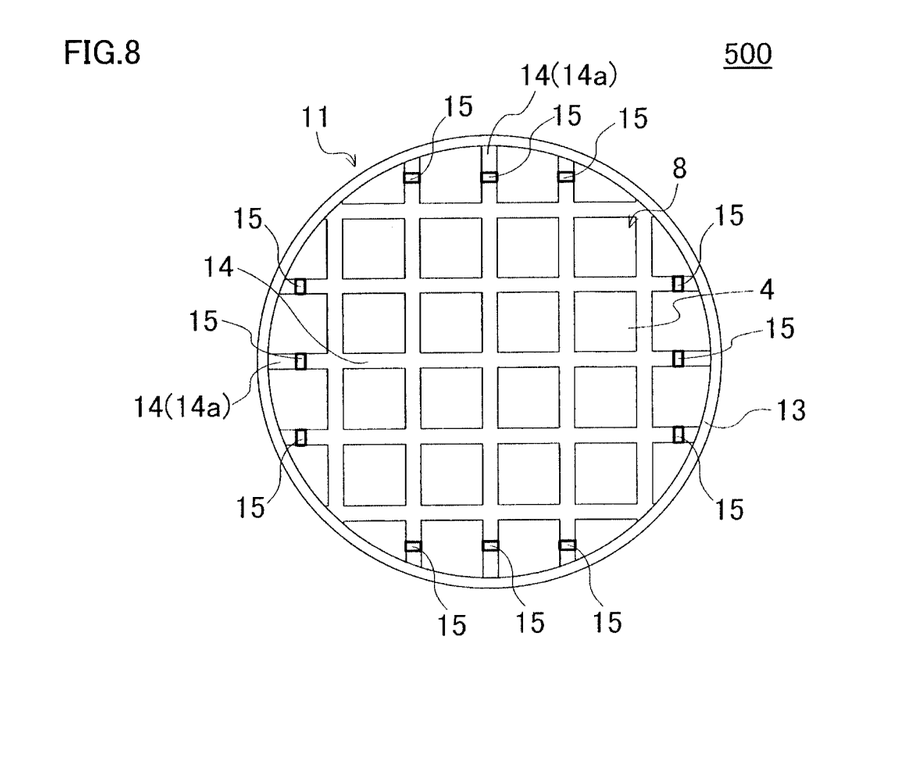
FIG. 8 is a plan view schematically showing further another embodiment of a honeycomb structure according to the present invention.

Herein, further other embodiments of a honeycomb structure according to the present invention will be explained with reference to FIGS. 6 to 8. FIGS. 6 to 8 are plan views schematically showing further other embodiments of a honeycomb structure according to the present invention. In addition, FIGS. 6 to 8 show a state where the partition walls 1 (see FIG. 2) and the cells 2 (see FIG. 2) of each of the honeycomb segments 4 are abstracted. In honeycomb structures 300, 400, and 500 shown in FIGS. 6 to 8, the same components as those of the honeycomb structure 100 shown in FIGS. 1 to 4 have the same reference numbers and their descriptions are omitted.

The honeycomb structure 300 shown in FIG. 6 is obtained by bonding up to the six honeycomb segments 4 with the bonding layers 14 in the vertical and horizontal directions of the paper space. The circumferential portions of the honeycomb segments 4 bonded with the bonding layers 14 are grounded in a circular shape, and the circumferential wall 13 is disposed to surround the grounded honeycomb segments 4. In the honeycomb structure 300 shown in FIG. 6, the unbonded portions 15 respectively exist in the circumferential bonding layers 14a on the extended lines extending, in the directions in which the bonding layers 14 extend, from an intersection of the bonding layers 14 existing at the centroid of the inflow end face 11 of the honeycomb segment bonded body 8. The total number of the unbonded portions 15 is four in the inflow end face 11.

The honeycomb structure 400 shown in FIG. 7 is obtained by bonding up to the seven honeycomb segments 4 with the bonding layers 14 in the vertical and horizontal directions of the paper space. In the honeycomb structure 400 shown in FIG. 7, intersections of the bonding layers 14 closest to the centroid of the inflow end face 11 of the honeycomb segment bonded body 8 are four around this centroid. For this reason, in the honeycomb structure 400 shown in FIG. 7, the unbonded portions 15 respectively exist in the circumferential bonding layers 14a on the extended lines extending, in the directions in which the bonding layers 14 extend, from the respective intersections of the bonding layers 14 closest to the centroid. The total number of the unbonded portions 15 is eight in the inflow end face 11.

The honeycomb structure 500 shown in FIG. 8 is obtained by bonding up to the six honeycomb segments 4 with the bonding layers 14 in the vertical and horizontal directions of the paper space. In the honeycomb structure 500 shown in FIG. 8, the unbonded portions 15 respectively exist in the circumferential bonding layers 14a on the extended lines extending, in the directions in which the bonding layers 14 extend, from an intersection of the bonding layers 14 existing at the centroid of the inflow end face 11 of the honeycomb segment bonded body 8. Furthermore, in the honeycomb structure 500 shown in FIG. 8, the unbonded portions 15 respectively further exist in the circumferential bonding layers 14a on the extended lines extending, in the directions in which the bonding layers 14 extend, from intersections being starting points of the extended lines and located one more outside from the intersection of the bonding layers 14 existing at the centroid. Therefore, the total number of the unbonded portions 15 is 12 in the inflow end face 11. The further existence of the unbonded portions 15 in the circumferential bonding layers 14a corresponding to intersections being the starting points of the extended lines and located one more outside the intersection of the bonding layers 14 existing at the centroid, as described above, makes it possible to more effectively suppress the extension of a crack occurring in the bonding layers 14.

The width of each of the bonding layers 14 in the inflow end face 11 or the outflow end face 12 of the honeycomb structure 100 is preferably 0.3 to 3.0 mm, is further preferably 0.5 to 2.0 mm, and is particularly preferably 0.5 to 1.5 mm. When the width of each of the bonding layers 14 is less than 0.3 mm, the bond strength of the honeycomb structure 100 may become easy to be decreased. When the width of each of the bonding layers 14 exceeds 3.0 mm, the pressure loss of the honeycomb structure 100 may be increased.

The material of the bonding layers 14 has no particular limitation and thus can use the material of bonding layers in the conventionally known honeycomb structure.

The shape of the cell 2 formed in the honeycomb segment 4 has no particular limitation. For example, the shape of the cell 2 in a cross section orthogonal to the direction of extension of the cell 2 can include a polygon, a circular shape, an elliptical shape, and the like. A polygon can include a triangle, a quadrangle, a pentagon, a hexagon, an octagon, and the like. In addition, it is preferable that the shape of the cell 2 is a triangle, a quadrangle, a pentagon, a hexagon, and/or an octagon. Moreover, in terms of the shape of the cell 2, the shapes of all the cells 2 may be the same or may be different from each other. For example, although it is not shown, quadrangular cells and octagonal cells may be mixed. Moreover, in terms of the size of the cell 2, the sizes of all the cells 2 may be the same or may be different from each other. For example, although it is not shown, among the plurality of cells, the size of some cells may be made larger and the size of other cells may be made relatively smaller.

A cell density of the cells 2 sectioned by the partition walls 1 is preferably 15 to 90 cells/cm$^2$ and is further preferably 30 to 60 cells/cm$^2$. By employing such the configuration, the honeycomb structure 100 according to the present embodiment can be preferably used as a filter for purifying exhaust gas emitted from the engine of the automobile.

The porosity of the partition walls 1 is preferably 30 to 80%, is further preferably 35 to 75%, and is particularly preferably 40 to 70%. The porosity of the partition walls 1 is a value measured by a mercury press-in method. The measurement of the porosity of the partition walls 1 can be performed by using Autopore 9500 (product name) made by Micromeritics for example. After cutting off a portion of the partition walls 1 of each of the honeycomb segments 4 to take a test piece, the measurement of the porosity can be performed by using this test piece. When the porosity of the partition walls 1 is less than 30%, the pressure loss of the honeycomb structure 100 itself may be increased and the deviation of the pressure loss after the load of a catalyst may be increased. When the porosity of the partition walls 1 exceeds 80%, strength and trapping performance of the honeycomb structure 100 as a filter may be decreased.

The shape of the honeycomb segment 4 has no particular limitation. For example, as the shape of the honeycomb segment 4, the cross-sectional shape orthogonal to the axial direction of this honeycomb segment 4 can have a prismatic columnar shape of a polygon such as a quadrangle and a hexagon. In addition, the honeycomb segments 4 disposed on the outermost circumference of the honeycomb structure 100 may have a shape in which a portion of a prismatic column is processed by grinding etc. in accordance with the entire shape of the honeycomb structure 100.

The entire shape of the honeycomb structure 100 has no particular limitation. For example, the entire shape of the honeycomb structure 100 shown in FIG. 1 is a round pillar shape in which the inflow end face 11 and the outflow end face 12 have a circular shape. Alternatively, although it is not shown, the entire shape of the honeycomb structure may be a pillar shape in which the inflow end face and the outflow end face have a substantially circular shape such as an elliptical shape, a racetrack shape, and an oval shape. Moreover, the entire shape of the honeycomb structure may be a prismatic columnar shape in which the inflow end face and the outflow end face have a shape of a polygon such as a quadrangle and a hexagon.

The materials that constitute the honeycomb segments 4 have no particular limitation, but at least one material selected from the following material group is preferable from the viewpoint of strength, heat resistance, durability, etc. The material group is a group of silicon carbide, silicon-silicon carbide based composite material, silicon nitride, cordierite, mullite, alumina, spinel, silicon carbide-cordierite based composite material, lithium aluminum silicate, aluminum titanate, and Fe—Cr—Al based metal. Among these, silicon carbide or silicon-silicon carbide based composite material is further preferable. The silicon-silicon carbide based composite material is a composite material in which silicon carbide (SiC) is aggregates and silicon (Si) is bonding materials.

The material of the plugging portion 5 has no particular limitation. For example, it is preferable that the material of the plugging portion 5 is similar to the materials illustrated as the materials that constitute the honeycomb segment 4.

The size of the honeycomb structure 100, for example, a length from the inflow end face 11 to the outflow end face 12 and the size of a cross section orthogonal to the direction of extension of the cell 2 of the honeycomb structure 100 have no particular limitation. When the honeycomb structure 100 according to the present embodiment is used as a filter for the purification of exhaust gas, it is sufficient to appropriately select each size to obtain optimum purification performance. For example, a length from the inflow end face 11 to the outflow end face 12 of the honeycomb structure 100 is preferably 150 to 305 mm and is particularly preferably 150 to 200 mm. Moreover, an area of a cross section orthogonal to the direction of extension of the cell 2 of the honeycomb structure 100 is preferably 144 to 330 mm$^2$ and is particularly preferably 144 to 178 mm$^2$.

In the honeycomb structure 100 according to the present embodiment, the plugging portions 5 are disposed in open ends of the predetermined cells 2 (outflow cells) in the inflow end face 11 and open ends of the residual cells 2 (inflow cell) in the outflow end face 12. It is preferable that the inflow cells and the outflow cells are alternately arranged with the partition walls 1 therebetween. Thereby, it is preferable that a checkered pattern is formed in both end faces of the honeycomb structure 100 by the plugging portions 5 and the "open ends of the cells 2".

In the honeycomb structure 100 according to the present embodiment, a catalyst may be loaded onto the partition walls 1 that forms the plurality of cells 2. To load a catalyst onto the partition walls 1 means that a catalyst is coated on the surfaces of the partition walls 1 and the inner walls of pores formed in the partition walls. By employing such the configuration, CO, NOx, HC, etc. in the exhaust gas can be converted into harmless substances by a catalytic reaction. Moreover, it is possible to promote the oxidation of PM such as the trapped soot.

(2) Method of Manufacturing Honeycomb Structure

A method of manufacturing the honeycomb structure according to the embodiment has no particular limitation. For example, the honeycomb structure can be manufactured by the following method. First, plastic kneaded material to make the honeycomb segment is prepared. The kneaded material to make the honeycomb segment can be prepared as raw material powder by appropriately adding water and an addition agent such as binder to a material selected from among preferable materials of the honeycomb segment described above.

Next, a prismatic columnar honeycomb formed body including a partition walls disposed to surround the plurality of cells and a segmented outer wall disposed on the outermost circumference is made by performing extrusion on the kneaded material obtained in this way. A plurality of the honeycomb formed bodies is made.

Plugging portions are made by drying the obtained honeycomb formed bodies by using a microwave and hot air and plugging the open ends of the cells with the same material as the material used for making the honeycomb formed bodies, for example. The honeycomb formed bodies may be further dried after making the plugging portions.

Next, the honeycomb segments are obtained by firing the honeycomb formed bodies in which the plugging portions are made. A firing temperature and a firing environment are different depending on raw materials. Those skilled in the art can select a firing temperature and a firing environment most suitable for the selected material.

Next, a segmented-structure honeycomb structure can be obtained by bonding the plurality of honeycomb segments by using a bonding material with respect to each other and drying and curing the segments and then processing the outer circumference to have a desired shape. The bonding material can use a material obtained by adding a liquid medium such as water to a ceramic material to make a paste state or a slurry state.

When manufacturing the honeycomb structure according to the present invention, bottomed-hollow unbonded portions are formed in the circumferential bonding layers of the bonding layers in the following method, for example. The unbonded portions are formed by cutting predetermined places of the bonding layers from the inflow end face or the outflow end face of the honeycomb structure by using a cutting tool such as a drill. When forming the unbonded portions, it is preferable to adjust a scraping amount of the bonding layers to have the predetermined width and depth.

Because a processed surface after the outer circumference of the honeycomb segment bonded body is processed has cells that are exposed, a circumferential wall may be formed by applying an outer coating material onto the processed surface of the honeycomb segment bonded body. The outer coating material can include a slurry state obtained by adding water and an addition agent such as organic binder, foamable resin, and dispersing agent to inorganic raw material such as inorganic fiber, colloidal silica, clay, and ceramic particles and kneading these, for example.

EXAMPLES

Hereinafter, the present invention will be more specifically explained by using Examples, but the present invention is not limited to these Examples.

Example 1

A mixed raw material obtained by mixing silicon carbide (SiC) powder and metallic silicon (Si) powder at a mass ratio of 80:20 was prepared as a ceramic raw material. A forming raw material was made by adding "hydroxypropyl methylcellulose as binder, water absorbable resin as pore former, and water" to the mixed raw material. The obtained forming raw material was kneaded by a kneader to obtain kneaded material.

Next, 36 square prismatic columnar honeycomb formed bodies were made by molding the obtained kneaded material by using a vacuum extruder. Each of these square prismatic columnar honeycomb formed bodies corresponds to a honeycomb segment.

Next, the obtained honeycomb formed bodies were dried by high frequency dielectric heating and then were dried at 120° C. for 2 hours by using a hot-air drying machine.

Next, plugging portions were formed in each of the honeycomb formed bodies after drying. More specifically, masking was first performed on the inflow end face of the honeycomb formed body after drying. Next, the masked end (end of inflow end face) was dipped in plugging slurry and the open ends of the unmasked cells (outflow cells) were filled up with the plugging slurry. In this way, the plugging portions were formed in the inflow end face of the honeycomb formed body after drying. Similarly, in case of the outflow end face of the honeycomb formed body after drying, plugging portions were formed in the inflow cells.

Then, the honeycomb formed body in which the plugging portions are formed was degreased and fired to obtain the honeycomb segment. The condition of the degreasing was 550° C. and 3 hours, and the condition of the firing was 1,450° C. and 2 hours under an argon atmosphere.

As described above, the honeycomb segments used for manufacturing a honeycomb structure according to Example 1 were made. In each of the made honeycomb segments, a cross section perpendicular to the axial direction had a square and the length (segment size) of one side of the square was 39 mm. These results are shown in the column of "Length (mm) of one side" of "Honeycomb segment" in Table 1. Moreover, in each of the honeycomb segments, the length of the axial direction was 203 mm.

In each of the honeycomb segments, the thickness of the partition walls was 0.3 mm and its cell density was 46 cells/cm$^2$. Moreover, the porosity of the partition walls was 41%. The porosity of the partition walls was measured by Autopore 9500 (product name) made by Micromeritics.

Next, a bonding material for bonding the honeycomb segments was prepared. Next, a honeycomb segment bonded body was made by bonding the 36 honeycomb segments with the bonding material in the state where these honeycomb segments are arranged so that their side faces face each other and performing a heat treatment on these segments at 700° C. In this case, bottomed-hollow unbonded portions were formed in the predetermined circumferential bonding layers by using a drill as a cutting tool.

As shown in FIG. 6, the honeycomb segment bonded body was made by bonding the total 36 honeycomb segments in which up to six segments in the vertical direction and up to six segments in the horizontal direction are arranged in its end face. The columns of "Number (pcs)" and "Arrangement (pcs×pcs)" in "Honeycomb segments" of Table 1 show the number and the arrangement of the honeycomb segments that are used in Examples. For example, when "6×6" is described in the column of "Arrangement (pcs×pcs)", the description means that up to the six honeycomb segments 4 in the vertical direction and up to the six honeycomb segments 4 in the horizontal direction are arranged, as shown in FIG. 6.

Next, the honeycomb structure according to Example 1 was obtained by grounding the outer circumference of the honeycomb segment bonded body in the shape of a round pillar and applying a coating material onto its outer circumferential surface. In the honeycomb structure according to Example 1, the diameter of the end face was 229 mm and the length of the axial direction was 203 mm. Moreover, In the honeycomb structure according to Example 1, the width of each of the bonding layers was 1.0 mm. Their results are shown in Table 1.

In the honeycomb structure according to Example 1, the four unbonded portions were formed in the circumferential bonding layers of each of the inflow end face and the outflow end face. In other words, the total eight unbonded portions were formed in the inflow end face and the outflow end face. The opening length B1 of each of the unbonded portions was 2 mm. The position ratio of the open end of each of the unbonded portions was 20%. The ratio of the void depth of each of the unbonded portions was 10%. The columns of "Circumferential bonding layers" in Table 2 show the respective values. The column of "End face" of "Positions of unbonded portions" in Table 2 shows the end face of the honeycomb structure in which the unbonded portions are formed. In other words, when the unbonded portions are formed in any one of the inflow end face and the inflow end face of the honeycomb structure, "One end" is written in the above column. In addition, when the unbonded portions are formed in both of the inflow end face and the outflow end face of the honeycomb structure, "Both ends" are written in the above column. Moreover, the column of "Reference diagram" of "Formation positions of unbonded portions" in Table 2 shows a drawing referring to the positions of intersections in which the unbonded portions are formed.

"Crack generation temperature (° C.) of circumferential bonding layers" and "Maximum crack length (mm) of circumferential bonding layers" were measured by performing a "rapid cooling test" on the honeycomb structure according to Example 1 in the following method. Moreover, evaluation was performed on "Bond strength of circumferential bonding layers" in the following method. Their results are shown in Table 3. Herein, "Maximum crack length (mm) of circumferential bonding layers" means the maximum crack length (mm) of the circumferential bonding layers located at the end face in which the unbonded portions are formed.

(Rapid Cooling Test)

As a rapid cooling test, the length of a crack of the circumferential bonding layers when E-sp evaluation by an electric furnace spalling test is performed was measured in the following method. First, the honeycomb structure was brought to a uniform temperature by putting the honeycomb structure in an electric furnace whose internal temperature is 200° C. and heating it for 2 hours. After that, the heated honeycomb structure was taken out from the electric furnace to rapidly cool it up to a room temperature. The confirmation of whether a crack occurs in any of the circumferential bonding layers was performed on the honeycomb structure after rapid cooling, and when a crack does not occur, the above heating and rapid cooling were repeatedly performed until a crack occurs in any of the circumferential bonding layers by raising the temperature in the furnace in unit of 25° C. As described above, its length was measured after generating a crack in any of the circumferential bonding layers.

(Bond Strength of Circumferential Bonding Layers)

The bond strength of the circumferential bonding layers was measured in the following method. First, a honeycomb structure, in which unbonded portions are not formed in circumferential bonding layers, like Comparative Example 1 to be described later was made. Hereinafter, this honeycomb structure is referred to as a "reference honeycomb structure". A measurement sample "a" for measuring a bond strength (hereinafter, "bond strength A1") in the circumferential portion was made by cutting off two outermost honeycomb segments that are bonded to each other with circumferential bonding layers from the made reference honeycomb structure. Herein, the circumferential bonding layers included in the measurement sample "a" includes a region in which unbonded portions are formed within the honeycomb structure (e.g., the honeycomb structure according to Example 1) to be measured. Next, a breaking load F1 when the circumferential bonding layers in the measurement sample "a" is broken, by gradually adding a load to the end face of the honeycomb segments within the made measurement sample "a" so that a loading speed is 2 mm/min, was measured by using a shear load measuring apparatus. Moreover, an area S of bonded surface of the circumferential bonding layers for bonding the honeycomb segments within the measurement sample "a" was measured. Then, "a bond strength (kPa) in the circumferential portion" was calculated as the bond strength A1 based on the following Equation (1). Next, a measurement sample "b" for measuring a bond strength (hereinafter, "bond strength A2") in the circumferential portion was made by cutting off two outermost honeycomb segments that are bonded to each other with circumferential bonding layers from the honeycomb structure (e.g., the honeycomb structure according to Example 1) to be measured. The measurement sample "b" is picked from the same region as that of the measurement sample "a" as described above, and the circumferential bonding layers included in the measurement sample "b" includes a region in which unbonded portions are formed. In a manner similar to that of the measurement sample "a", a breaking load F2 when the circumferential bonding layers is broken was measured on the made measurement sample "b". "The bond strength (kPa) in the circumferential portion" was calculated as the bond strength A2 based on the following Equation (2). Furthermore, the decrease rate (hereinafter, "bond strength decrease rate C (%)") of the bond strength A2 of the measurement sample "b" with respect to the bond strength A1 of the measurement sample "a" was calculated based on the following Equation (3). It is assumed that the case where the bond strength decrease rate C (%) is less than 10% is "A" and the case where it is not less than 10% is "B". The case of "A" was accepted as the pass.

Bond strength $A1$=Breaking load $F1$/Area $S$ of bonded surface      Equation (1):

Bond strength $A2$=Breaking load $F2$/Area $S$ of bonded surface      Equation (2):

Bond strength decrease rate $C$ (%)=$(1-A2/A1)\times 100\%$      Equation (3):

TABLE 1

| | Honeycomb bonded body | | Honeycomb segments | | | Bonding layer | Bonding layer other than circumferential bonding layers |
|---|---|---|---|---|---|---|---|
| | Diameter (mm) | Length (mm) | Length (mm) of one side | Number (pcs) | Arrangement (pcs × pcs) | Bonding width (mm) | Presence or absence of unbonded portions |
| Example 1 | 229 | 203 | 39 | 36 | 6 × 6 | 1.0 | Absence |
| Example 2 | 229 | 203 | 39 | 36 | 6 × 6 | 1.0 | Absence |
| Example 3 | 229 | 203 | 39 | 36 | 6 × 6 | 1.0 | Absence |
| Example 4 | 229 | 203 | 39 | 36 | 6 × 6 | 1.0 | Absence |
| Example 5 | 229 | 203 | 39 | 36 | 6 × 6 | 1.0 | Absence |
| Example 6 | 267 | 305 | 39 | 49 | 7 × 7 | 1.0 | Absence |
| Example 7 | 267 | 305 | 39 | 49 | 7 × 7 | 1.0 | Absence |
| Example 8 | 267 | 305 | 39 | 49 | 7 × 7 | 1.0 | Absence |

TABLE 1-continued

| | Honeycomb bonded body | | Honeycomb segments | | | Bonding layer | Bonding layer other than circumferential bonding layers |
|---|---|---|---|---|---|---|---|
| | Diameter (mm) | Length (mm) | Length (mm) of one side | Number (pcs) | Arrangement (pcs × pcs) | Bonding width (mm) | Presence or absence of unbonded portions |
| Comparative Example 1 | 229 | 203 | 39 | 36 | 6 × 6 | 1.0 | Absence |
| Comparative Example 2 | 267 | 305 | 39 | 49 | 7 × 7 | 1.0 | Absence |
| Comparative Example 3 | 229 | 203 | 39 | 36 | 6 × 6 | 1.0 | Absence |

TABLE 2

| | Circumferential bonding layers | | | | | |
|---|---|---|---|---|---|---|
| | Number (pcs) of unbonded portions | Position ratio (%) of open end of each of unbonded portions | Opening length B1(mm) of each of unbonded portions | Positions of unbonded portions End face | Reference diagram | Ratio (%) of void depth of each of unbonded portions |
| Example 1 | 8 | 20 | 2 | Both ends | FIG. 6 | 10 |
| Example 2 | 24 | 15 | 2 | Both ends | FIG. 8 | 20 |
| Example 3 | 24 | 10 | 2 | Both ends | FIG. 8 | 20 |
| Example 4 | 24 | 40 | 3 | Both ends | FIG. 8 | 45 |
| Example 5 | 12 | 40 | 1 | Both ends | FIG. 8 | 45 |
| Example 6 | 16 | 20 | 2 | Both ends | FIG. 7 | 20 |
| Example 7 | 16 | 40 | 2 | One end | FIG. 7 | 30 |
| Example 8 | 16 | 40 | 2 | Both ends | FIG. 7 | 45 |
| Comparative Example 1 | 0 | — | — | — | — | — |
| Comparative Example 2 | 0 | — | — | — | — | — |
| Comparative Example 3 | 24 | 80 | 15 | Both ends | FIG. 8 | 45 |

TABLE 3

| | Rapid cooling test | | |
|---|---|---|---|
| | Crack generation temperature (° C.) of circumferential bonding layers | Maximum crack length(*1) (mm) of circumferential bonding layers | Bond strength of circumferential bonding layers Evaluation |
| Example 1 | 350 | 8 | A |
| Example 2 | 350 | 6 | A |
| Example 3 | 350 | 4 | A |
| Example 4 | 350 | 16 | A |
| Example 5 | 350 | 16 | A |
| Example 6 | 250 | 8 | A |
| Example 7 | 250 | 16 | A |
| Example 8 | 250 | 16 | A |
| Comparative Example 1 | 350 | 75(*2) | — |
| Comparative Example 2 | 250 | 80(*2) | — |
| Comparative Example 3 | 350 | 32 | B |

(*1) Maximum crack length (mm) of circumferential bonding layers located in end face in which unbonded portions are formed.
(*2) Crack length without unbonded portions.

Examples 2 to 8

Honeycomb structures were manufactured in the same manner as in Example 1 except for the case where the honeycomb structures are configured to have the features of Table 1 and the configuration of the unbonded portions is changed as shown in Table 2.

Comparative Example 1

A honeycomb structure was manufactured in the same manner as in Example 1 except for the case where the honeycomb structure is configured to have the features of Table 1 and the unbonded portions are not formed.

Comparative Example 2

A honeycomb structure was manufactured in the same manner as in Example 1 except for the case where the honeycomb structure is configured to have the features of Table 1 and the unbonded portions are not formed.

Comparative Example 3

A honeycomb structure was manufactured in the same manner as in Example 1 except for the case where the honeycomb structure is configured to have the features of Table 1 and the configuration of the unbonded portions is changed as shown in Table 2.

"Crack generation temperature (° C.) of circumferential bonding layers" and "Maximum crack length (mm) of circumferential bonding layers" were measured by performing a "rapid cooling test" on the honeycomb structures of Examples 2 to 8 and Comparative Examples 1 to 3 in the same manner as in Example 1. Moreover, the evaluation on "Bond strength of circumferential bonding layers" has been performed on the honeycomb structures of Examples 2 to 8 and Comparative Example 3 in the same manner as in Example 1. Their results are shown in Table 3.

(Result)

According to the honeycomb structures of Examples 1 to 8, during the rapid cooling test, the maximum crack length of the circumferential bonding layers in the end face in which the unbonded portions are formed was extremely short as compared to Comparative Examples 1 to 3. According to the honeycomb structure of Example 1, because the unbonded portions are appropriately formed at points at which a crack is easiest to occur although the number of the unbonded portions is smaller than that of Embodiment 2 etc., the considerable decrease in the maximum crack length was confirmed as compared to Comparative Example 1 etc. Moreover, according to the honeycomb structure of Comparative Example 3, it was confirmed that the bond strength of the circumferential bonding layers is largely decreased and the maximum crack length is increased along with this.

INDUSTRIAL APPLICABILITY

The honeycomb structures according to the present invention can be used as a trapping filter for removing particulates etc. contained in exhaust gas emitted from a direct injection type gasoline engine, a diesel engine, or the like.

DESCRIPTION OF REFERENCE NUMERALS 1 partition wall
2 cell
4 honeycomb segment
5 plugging portion
8 honeycomb segment bonded body
11 inflow end face
12 outflow end face
13 circumferential wall
14 bonding layer
14a circumferential bonding layer
15, 15A unbonded portions
100, 200, 300, 400, 500 honeycomb structures

What is claimed is:

1. A honeycomb structure comprising:
a plurality of prismatic columnar honeycomb segments;
bonding layers that bond side faces of the plurality of honeycomb segments with respect to each other; and
a circumferential wall that is disposed to surround an outer circumference of a honeycomb segment bonded body obtained by bonding the honeycomb segments with the bonding layers in a state where the honeycomb segments are arrayed in a grid pattern, wherein
each of the honeycomb segments includes porous partition walls disposed to surround a plurality of cells extending from an inflow end face to an outflow end face in an axial direction and a segmented outer wall disposed to surround the partition walls,
an end of each of the cells in each of the honeycomb segments is plugged by a plugging portion at any one of the inflow end face and the outflow end face,
the bonding layers includes bottomed-hollow unbonded portions, which extend toward an internal side in the axial direction from the inflow end face or the outflow end face, in portions of circumferential bonding layers for bonding the honeycomb segments arranged on an outermost circumference of the honeycomb segment bonded body,
the unbonded portions exist, in the inflow end face or the outflow end face, on respective extended lines extending, in directions in which the bonding layers extend, from an intersection of the bonding layers existing at a position closest to a centroid of the corresponding inflow end face or the corresponding outflow end face of the honeycomb segment bonded body,
an opening length of each of the unbonded portions in the directions in which the bonding layers extend is 1 to 10 mm in the inflow end face or the outflow end face,
a ratio of an opening depth of each of the unbonded portions in the axial direction to a length of each of the honeycomb segments in the axial direction is 10 to 45%, and
a ratio of a distance from the circumferential wall to a point at which an open end of each of the unbonded portions ends with respect to a length of each of the circumferential bonding layers in the directions in which the bonding layers extend is 5 to 100% in the inflow end face or the outflow end face.

2. The honeycomb structure according to claim 1, wherein the unbonded portions further exist, in the inflow end face or the outflow end face, on extended lines extending, in the directions in which the bonding layers extend, from intersections of the bonding layers existing at a second closest position to the centroid of the corresponding inflow end face or the corresponding outflow end face of the honeycomb segment bonded body.

3. The honeycomb structure according to claim 1, wherein the unbonded portions exist in both of the inflow end face and the outflow end face of the honeycomb segment bonded body.

4. The honeycomb structure according to claim 2, wherein the unbonded portions exist in both of the inflow end face and the outflow end face of the honeycomb segment bonded body.

5. The honeycomb structure according to claim 1, wherein a width of each of the bonding layers in the inflow end face or the outflow end face of the honeycomb segment bonded body is 0.3 to 3.0 mm.

6. The honeycomb structure according to claim 2, wherein a width of each of the bonding layers in the inflow end face or the outflow end face of the honeycomb segment bonded body is 0.3 to 3.0 mm.

7. The honeycomb structure according to claim 3, wherein a width of each of the bonding layers in the inflow end face or the outflow end face of the honeycomb segment bonded body is 0.3 to 3.0 mm.

8. The honeycomb structure according to claim 4, wherein a width of each of the bonding layers in the inflow end face or the outflow end face of the honeycomb segment bonded body is 0.3 to 3.0 mm.

9. The honeycomb structure according to claim 1, wherein the unbonded portions are formed at positions that are away from an intersection at which the circumferential bonding layers having the unbonded portions intersect with the circumferential wall, such that the unbonded portions are not in contact with the circumferential wall.

* * * * *